(12) United States Patent
Sasaki et al.

(10) Patent No.: US 12,542,565 B2
(45) Date of Patent: Feb. 3, 2026

(54) APPARATUS, SENSOR AND ELECTRONIC DEVICE

(71) Applicant: CANON KABUSHIKI KAISHA, Tokyo (JP)

(72) Inventors: Ken Sasaki, Tokyo (JP); Hitoshi Nasu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/472,069

(22) Filed: Sep. 21, 2023

(65) Prior Publication Data

US 2024/0106454 A1    Mar. 28, 2024

(30) Foreign Application Priority Data

Sep. 26, 2022  (JP) ................................. 2022-152807

(51) Int. Cl.
    *H03M 1/00*     (2006.01)
    *H03M 3/00*     (2006.01)
    *H04N 25/772*   (2023.01)

(52) U.S. Cl.
    CPC .......... *H03M 3/466* (2013.01); *H04N 25/772* (2023.01)

(58) Field of Classification Search
    CPC ...... H03M 3/466; H03M 3/396; H03M 3/458; H04N 25/772; H04N 25/709; H04N 25/78
    USPC ........................................................ 341/126
    See application file for complete search history.

(56) References Cited

U.S. PATENT DOCUMENTS

2015/0281623 A1* 10/2015 Okada .................... H04N 25/70
                                                                348/280

FOREIGN PATENT DOCUMENTS

WO          2018163679 A1     9/2018

\* cited by examiner

*Primary Examiner* — Jean B Jeanglaude
(74) *Attorney, Agent, or Firm* — Canon U.S.A., Inc. IP Division (57) ABSTRACT

An apparatus includes a plurality of analog-to-digital conversion units that performs analog-to-digital conversion using ΔΣ modulation by comparing a signal output from a plurality of pixels to a reference voltage; and a plurality of supply units that supply one of a plurality of different reference voltages to each of the plurality of analog-to-digital conversion units. The plurality of supply units supply different reference voltages to adjacent analog-to-digital conversion units among the plurality of analog-to-digital conversion units.

12 Claims, 7 Drawing Sheets

| READOUT CIRCUIT | COLOR OF PIXEL SIGNAL | REFERENCE VOLTAGE TO BE USED |
|---|---|---|
| 208a | R | Vref1 |
| 208b | R | Vref2 |
| 208c | R | Vref1 |
| 208d | R | Vref2 |
| 208e | G | Vref1 |
| 208f | G | Vref2 |
| 208g | G | Vref1 |
| 208h | G | Vref2 |

APPARATUS, SENSOR AND ELECTRONIC DEVICE

BACKGROUND

Technical Field

The aspect of the embodiments relates to an apparatus, a sensor and electronic device using the same, and more particularly to an analog-to-digital conversion technique using ΔΣ modulation.

Description of the Related Art

Conventionally, in an image sensor used in a digital camera or the like, a so-called column analog-to-digital (hereinafter referred to as A/D) conversion type CMOS image sensor in which analog signals of the pixels are A/D converted using A/D conversion circuits provided for columns of pixels, respectively, arranged in a matrix and sequentially read out is known.

For example, International Publication No. 2018/163679 discloses a configuration of a CMOS image sensor using ΔΣ modulation in A/D conversion circuits.

However, in the conventional technology disclosed in International Publication No. 2018/163679, when the power supply circuit cannot supply the instantaneous current required for parallel actuation of the comparators in the ΔΣ A/D conversion circuits, noise accompanying voltage fluctuations may occur and deteriorate the image quality.

SUMMARY

According to an aspect of the embodiments, provided is an apparatus comprising: one or more processors and/or circuitry which function as: a plurality of analog-to-digital conversion units that performs analog-to-digital conversion using ΔΣ modulation by comparing a signal output from a plurality of pixels to a reference voltage; and a plurality of supply units that supply one of a plurality of different reference voltages to each of the plurality of analog-to-digital conversion units, wherein the plurality of supply units supply different reference voltages to adjacent analog-to-digital conversion units among the plurality of analog-to-digital conversion units.

Further, according to another aspect of the embodiments, provided is a sensor comprising: a plurality of pixels; and an apparatus comprising one or more processors and/or circuitry which function as: a plurality of analog-to-digital conversion units that performs analog-to-digital conversion using ΔΣ modulation by comparing a signal output from the plurality of pixels and a reference voltage; and a plurality of supply units that supply one of a plurality of different reference voltages to each of the plurality of analog-to-digital conversion units, wherein the plurality of supply units supply different reference voltages to adjacent analog-to-digital conversion units among the plurality of analog-to-digital conversion units.

Furthermore, according to yet another aspect of the embodiments, provided is an electronic device comprising: a sensor comprising: a plurality of pixels; and an apparatus comprising one or more processors and/or circuitry which function as: a plurality of analog-to-digital conversion units that performs analog-to-digital conversion using ΔΣ modulation by comparing a signal output from the plurality of pixels and a reference voltage; and a plurality of supply units that supply one of a plurality of different reference voltages to each of the plurality of analog-to-digital conversion units; and a control unit that switches the reference voltage to be supplied to each of the plurality of analog-to-digital conversion units according to an actuation mode of the sensor, wherein the plurality of supply units supply different reference voltages to adjacent analog-to-digital conversion units among the plurality of analog-to-digital conversion units.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

DESCRIPTION OF THE EMBODIMENTS

Hereinafter, embodiments will be described in detail with reference to the attached drawings. Note, the following embodiments are not intended to limit the scope of the disclosure, and limitation is not made to a disclosure that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
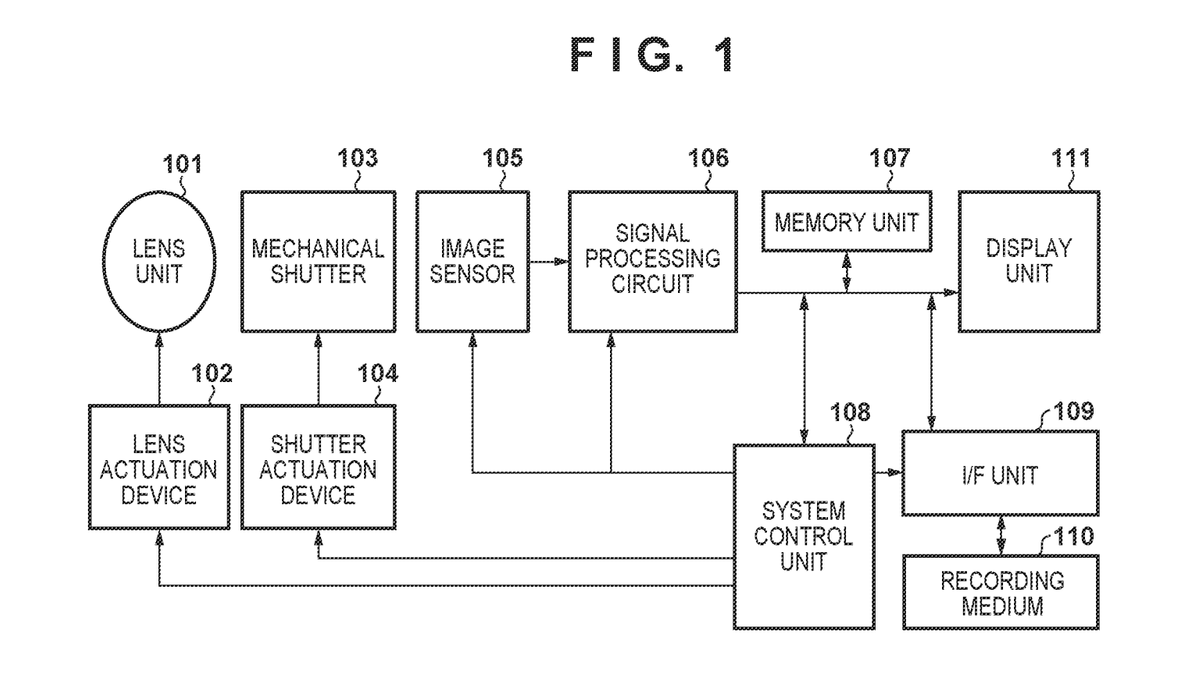
FIG. 1 is a block diagram showing a schematic configuration of an image capturing apparatus according to an embodiment of the disclosure.

FIG. 1 is a block diagram showing a configuration of an image capturing apparatus using an image sensor according to a first embodiment of the disclosure. The image capturing apparatus to which the aspect of the embodiments can be applied may be an electronic device with a camera function, which may be a camera such as a digital camera and a digital video camera, or may be a mobile telephone equipped with a camera, a computer equipped with a camera, a game device, and so forth.

In FIG. 1, a lens unit 101 includes a plurality of lenses including a zoom lens, a focus lens, and so forth, an aperture, and the like, and zoom control, focus control, aperture control, and the like are performed by a lens actuation device 102. An optical image of a subject incident through the lens unit 101 is formed on an image sensor 105.

Note that the lens unit 101 may be configured integrally with the image capturing apparatus, or may be configured to be detachable. A mechanical shutter 103 is controlled by a shutter actuation device 104. The image sensor 105 photo-electrically converts the optical image of the subject formed by the lens unit 101 and outputs an image signal.

A signal processing circuit 106 performs digital gain processing for applying a digital gain to the image signal output from the image sensor 105, various corrections, data compression, etc., and outputs image data. A memory unit 107 is used to temporarily store the image data. A system control unit 108 performs various operations and controls the entire image capturing apparatus. An I/F unit 109 is an interface for performing recording and reading out on a recording medium 110, and the recording medium 110 is a semiconductor memory such as a flash memory for holding image data, and the like, and is detachably configured. A display unit 111 displays various information and captured images.

Next, an operation at the time of shooting in the image capturing apparatus having the above configuration will be briefly described.

When a main power supply switch (not shown) is turned on, power supply to the system control unit 108 is started, and power supply to the imaging circuits such as the signal processing circuit 106 is also started. Then, when a release button (not shown) is pushed or the like to instruct shooting, shooting operation is started. After the shooting operation is finished, an image signal output from the image sensor 105 is subjected to image processing including various corrections and digital gain processing in the signal processing circuit 106, and the obtained image data is written to the memory unit 107 in response to an instruction from the system control unit 108. The image data held in the memory unit 107 is recorded on the detachable recording medium 110 such as a semiconductor memory through the I/F unit 109 under the control of the system control unit 108.

Also, ROW image data may be sent to an external computer or the like via an external I/F unit (not shown), and image processing may be performed in the computer or the like.

Figure 2:
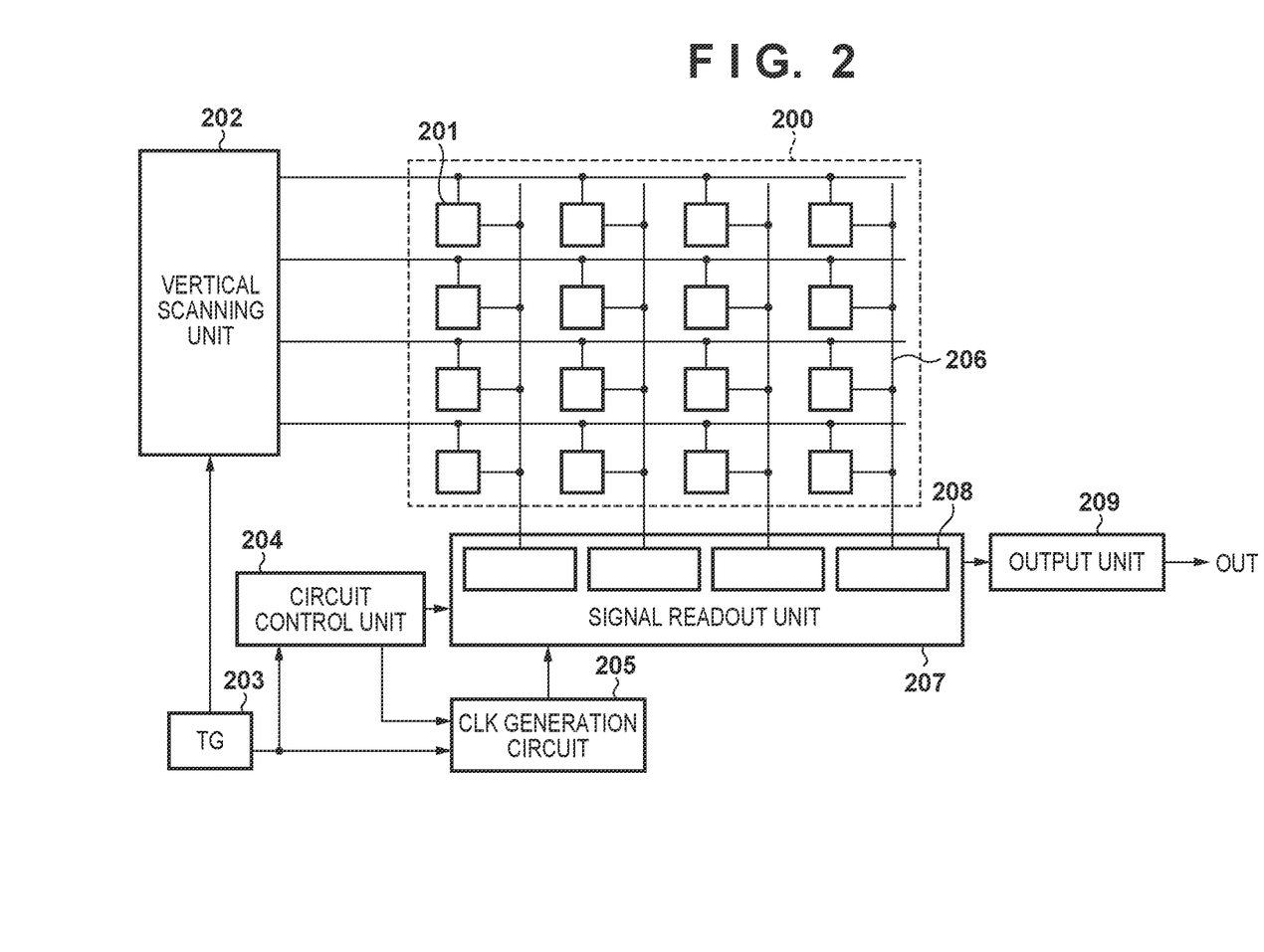
FIG. 2 is a block diagram showing a schematic configuration of an image sensor according to a first embodiment.

FIG. 2 is a block diagram showing a schematic configuration of the image sensor 105 in this embodiment.

The image sensor 105 includes a pixel section 200, a vertical scanning unit 202, a timing generator (TG) 203, a circuit control unit 204, a CLK generation circuit 205, column output lines 206, a signal readout unit 207 and an output unit 209.

A plurality of pixels 201 are arranged in a matrix in the pixel section 200. For simplicity of explanation, the pixels 201 are shown as an array of 4×4 pixels in the pixel section 200, but in practice a large number of pixels, for example several millions or more, are arranged. The signal readout unit 207 has a plurality of readout circuits 208.

The vertical scanning unit 202 selects the pixels 201 of the pixel section 200 in units of row and supplies plural kinds of actuation signals to each pixel 201 of the selected row. As a result, the pixel signals of the pixels 201 in the selected row are output to the signal readout unit 207 via the column output lines 206. The output pixel signals are converted into digital signals in the respective readout circuits 208 and output to the outside of the image sensor 105 via the output unit 209.

The readout circuit 208 A/D-converts the input pixel signal into a digital signal of a predetermined number of bits. Here, a so-called ΔΣ A/D conversion method is used for the A/D conversion.

The output unit 209 converts the digital signal of each pixel into a predetermined signal format and outputs it to the outside of the image sensor 105 from the transmission line.

The TG 203 sends a timing signal to the vertical scanning unit 202, and the vertical scanning unit 202 generates control signals for actuating the pixels 201 based on the timing signal and actuates the pixels 201. The circuit control unit 204 controls the CLK generation circuit 205 and the signal readout unit 207 based on the timing signal from the TG 203. Further, the CLK generation circuit 205 generates a clock signal to be supplied to the signal readout unit 207 based on a clock signal supplied from the TG 203 and control by the circuit control unit 204.

Figure 3:
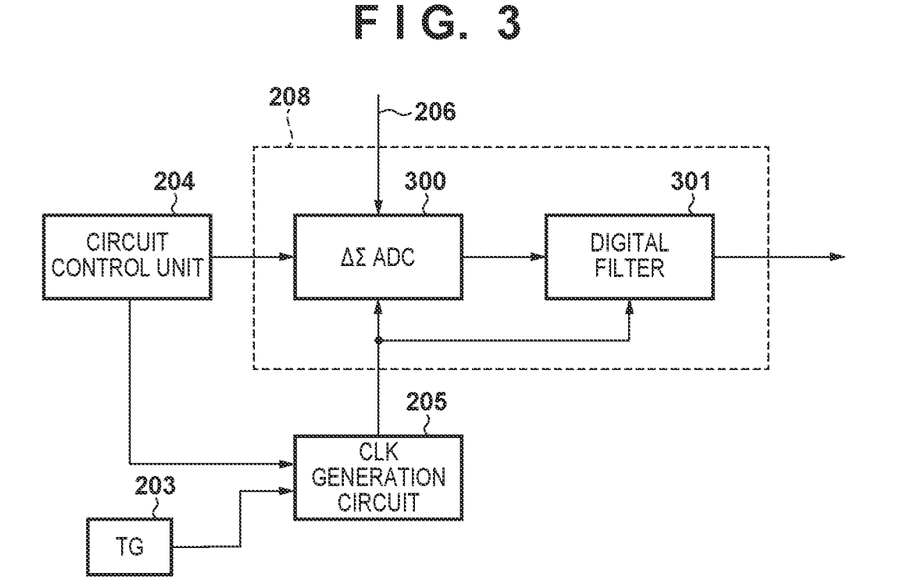
FIG. 3 is a block diagram showing a configuration of a readout circuit according to the embodiment.

FIG. 3 is a block diagram showing the configuration of each readout circuit 208 shown in FIG. 2.

The readout circuit 208 includes an analog-to-digital converter (ΔΣ ADC) 300 using ΔΣ modulation and a digital filter 301. The ΔΣ ADC 300 converts the pixel signal input via the column output line 206 into a digital signal using ΔΣ modulation. The digital filter 301 removes out-of-band quantization noise shifted to a higher frequency by the ΔΣ modulation. Also, the digital filter 301 reduces the output rate and/or converts the pixel signal into a multi-bit signal by thinning out and/or taking moving average of the high-rate output of the ΔΣ ADC 300.

Figure 4:
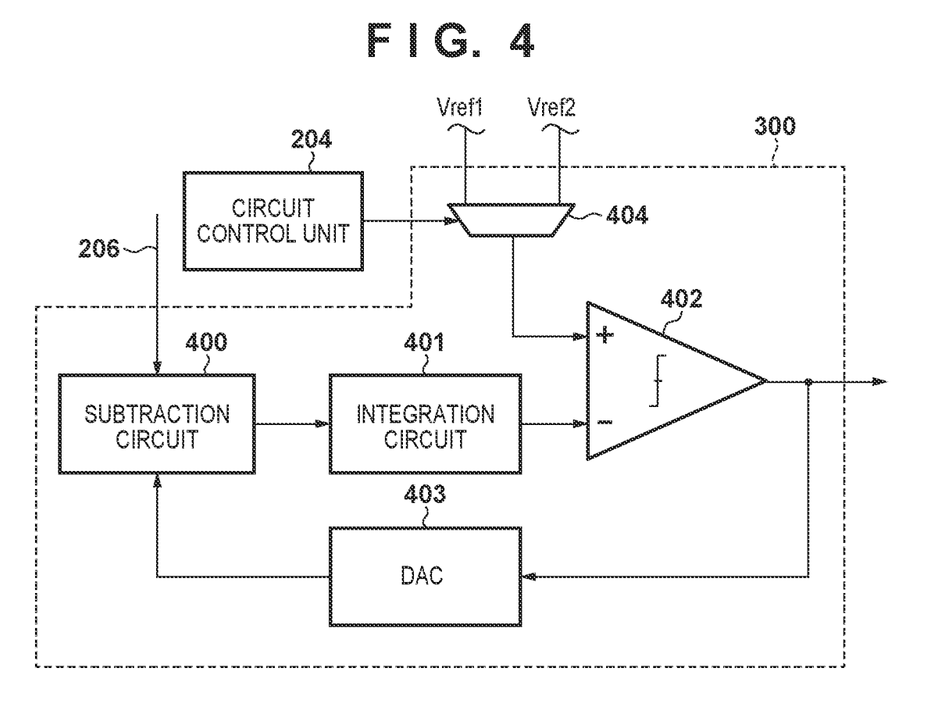
FIG. 4 is a block diagram showing a configuration of a ΔΣ ADC according to the embodiment.

FIG. 4 is a block diagram illustrating the configuration of the ΔΣ ADC 300 shown in FIG. 3.

As shown in FIG. 4, the ΔΣ ADC 300 consists of a subtraction circuit 400, an integration circuit 401, a comparator 402, a digital-to-analog converter (DAC) 403, and a reference voltage switching unit 404.

The subtraction circuit 400 outputs the difference between the pixel signal input via the column output line 206 and the output signal of the DAC 403 to the integration circuit 401. Note that a configuration in which a sample-and-hold circuit is provided between the column output line 206 and the subtraction circuit 400 may be used. In that case, the pixel signal output from the sample-and-hold circuit is input to the subtraction circuit 400.

The integration circuit 401 has an integrator that integrates the input signal from the subtraction circuit 400. As the integration circuit 401, a general integration circuit such as a gm-C integration circuit using a transconductor or an RC integration circuit using an operational amplifier may be used.

The comparator 402 compares a reference voltage Vref1 or Vref2 output from the reference voltage switching unit 404 with a voltage signal output from the integration circuit 401 in synchronization with the clock signal, and outputs the comparison result as a 1-bit digital signal. For example, when the voltage signal output from the integration circuit 401 is lower than the reference voltage Vref1 or Vref 2, 0 is output, and when it is equal to or higher than the reference voltage Vref1 or Vref 2, 1 is output. This digital signal is supplied to the digital filter 301 and the DAC 403.

The DAC 403 converts the digital signal output from the comparator 402 into a predetermined analog signal, and outputs it to the subtraction circuit 400. For example, when the digital signal output is 1, an analog signal with a predetermined level is output. Various kinds of circuits can be used as the configuration of the digital-to-analog conversion circuit.

The subtraction circuit 400, integration circuit 401, comparator 402, and DAC 403 form a feedback loop.

The reference voltage switching unit 404 receives the control signal output from the circuit control unit 204 to switch between the reference voltages Vref1 and Vref2 and supply either of the voltages to the comparator 402. The circuit control unit 204 controls the reference voltage switching unit 404, thereby AD conversion processing is performed by using a plurality of reference voltages in the comparators 402 operating in parallel.

FIGS. 5A to 5D show examples of input and output voltage waveforms of the comparator 402 according to the first embodiment.

The voltage waveforms shown in FIGS. 5A to 5D exemplify part of the process of ΔΣ A/D converting pixel signals of the same level input to the ΔΣ ADC 300 via the column output line 206 using different reference voltages Vref. In practice, such a waveform pattern is repeated for a predetermined period of time.

Figure 5A:
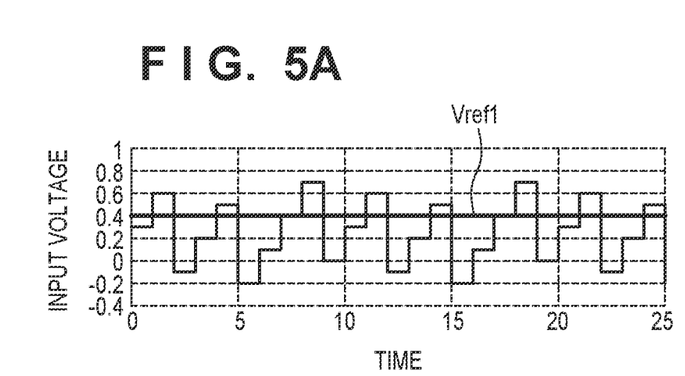
FIGS. 5A to 5D are diagrams showing examples of input voltage waveforms and output voltage waveforms of a comparator according to the first embodiment.
Figure 5B:
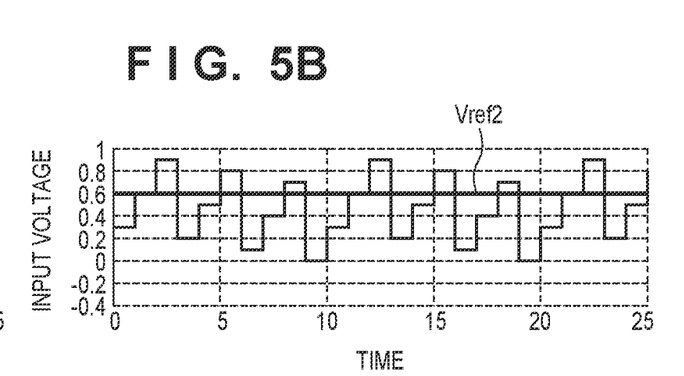
Figure 5C:
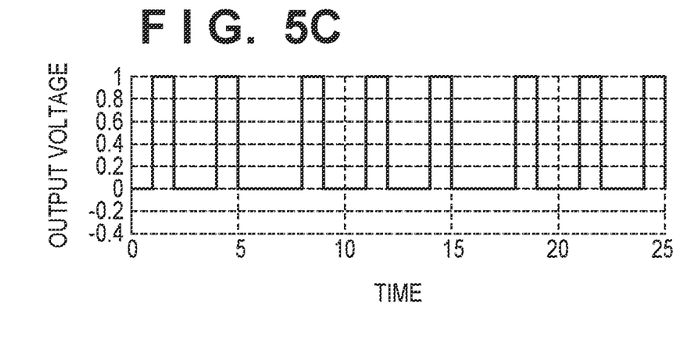
Figure 5D:
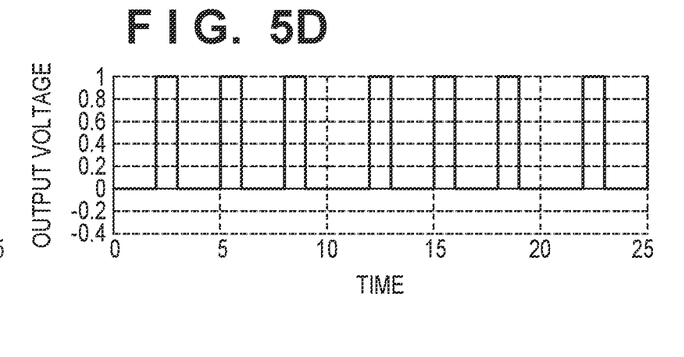

FIGS. 5A and 5B show voltage waveforms on the input terminal side, that is, the output voltage of the integration circuit 401 and the reference voltages. FIG. 5C is a ΔΣ-modulated digital signal waveform on the output terminal side corresponding to FIG. 5A, and FIG. 5D is a ΔΣ-modulated digital signal waveform on the output terminal side corresponding to FIG. 5B. Further, in FIGS. 5A to 5D, one unit of time on the horizontal axis represents one clock cycle.

Also, as shown in FIGS. 5A and 5B, since the states of the ΔΣ ADCs 300 are the same at the start of the ΔΣ A/D conversion processing (immediately after each circuit is reset); thus at time 0, voltages input to the comparator 402 via the subtraction circuit 400 and the integration circuit 401 have the same level. FIGS. 5A and 5B illustrate this voltage as 0.3V.

In the example shown in FIG. 5A, the reference voltage of the comparator 402 is Vref1=0.4V, and in the example shown in FIG. 5B, the reference voltage of the comparator 402 is Vref2=0.6V. Note that in the embodiment of the disclosure, Vref1=0.4V and Vref2=0.6V are merely examples, and in practice they are appropriately determined according to the designed voltage range of the image sensor 105.

Since the output digital signal of the comparator 402 is synchronized with the clock signal, when pixel signals of the same level are input to the A/ADCs 300 operating in parallel, each comparator 402 will synchronously output the same digital signal. At this time, the power supply circuit may not be able to supply the instantaneous current required for the operation of each comparator 402, and noise may occur due to instantaneous voltage fluctuations. If there are a particularly large number of comparators 402 operating in parallel like the image sensor 105, such kickback noise is superimposed and propagates inside and outside the readout circuit 208, thereby degrading the image quality of the output image.

Therefore, in this embodiment, the reference voltage Vref1 is supplied to one part of the plurality of comparators 402, and the reference voltage Vref2 is supplied to the other part of the plurality of comparators 402 as shown in FIGS. 5A to 5D. As a result, even if pixel signals of the same level are input to the ΔΣ ADCs 300, the ΔΣ ADCs 300 operate such that the output voltage waveforms of the integration circuit 401 are different from each other as shown in FIGS. 5A and 5B.

In FIGS. 5A and 5B, the output voltage of the integration circuit 401 is the same at time 0, however, since the reference voltages are different, the timing of the next inversion of the outputs of the comparators 402 shifts, resulting in at time 1 in FIG. 5A and at time 2 in FIG. 5B. If the output voltages of FIGS. 5C and 5D are compared, as the digital signal waveforms change at different timings, so the kickback noise of the circuit system can be reduced, and the image quality of the image sensor 105 can be improved.

As in the present embodiment, when the optical image of the subject formed on the image sensor 105 is converted into pixel signals, the pixel signals from adjacent pixels 201 tend to be at the same level. For this reason, the circuit control unit 204 performs switching control so that the reference voltages are different from each other in the readout circuit 208 that reads the signals of the adjacent pixels 201, therefore, it is easily to obtain the kickback noise reduction effect described above.

As described above, according to the first embodiment, it is possible to reduce the influence of noise in the ΔΣ ADCs due to parallel operation.

Further, the output signal of the comparator 402 is further processed by the digital filter 301 in the subsequent stage. More specifically, moving average processing is performed many times on a digital signal that has been ΔΣ modulated at an oversampling rate, thereby converting the digital signal into a multi-bit signal value for each pixel. Therefore, the phase shift caused by using the different reference voltages as shown in FIGS. 5C and 5D does not affect the process of digital filtering the ΔΣ-modulated signal.

Second Embodiment

Next, a second embodiment of the disclosure will be described.

In the above-described first embodiment, since the signals of the adjacent pixels 201 are likely to be pixel signals of the same level, the configuration for performing switching control in such a manner that the circuit control unit 204 supplies different reference voltages to the readout circuits 208 that read out the signals of the adjacent pixels 201 has been described.

On the other hand, in the second embodiment, a case will be described in which the pixels 201 are provided with color filters, and the switching control of the reference voltage is performed so that the reference voltages of the pixels provided with the color filter having the same spectral characteristics are different. Note that the overall configuration of the image capturing apparatus is the same as that described with reference to FIG. 1 in the first embodiment, so the description is omitted.

Figure 6:
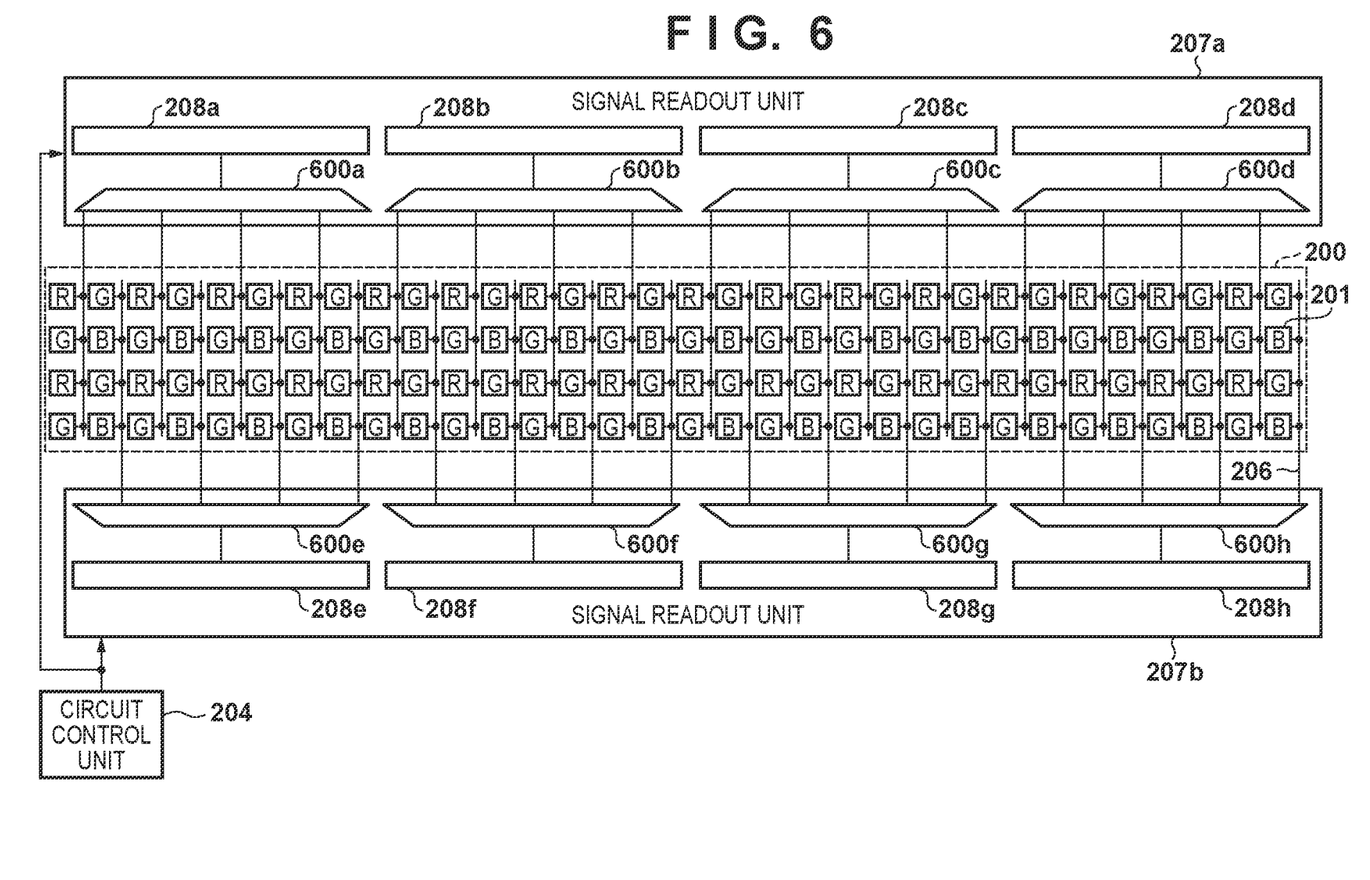
FIG. 6 is a block diagram showing a schematic configuration of an image sensor according to a second embodiment.

FIG. 6 is a block diagram showing a schematic configuration of the image sensor 105 in the second embodiment. The same reference numerals are given to the same configurations as those of the image sensor 105 shown in FIG. 2, and the description thereof will be omitted as appropriate.

The image sensor 105 in the second embodiment has a configuration in which two signal readout units 207a and 207b are provided with respect to the pixel section 200. Further, the signal readout unit 207a comprises readout circuits 208a, 208b, 208c, 208d and selection circuits 600a, 600b, 600c, 600d.

Further, the signal readout unit 207b comprises readout circuits 208e, 208f, 208g and 208h, and selection circuits 600e, 600f, 600g and 600h. In FIG. 6, 32×4 pixels are shown in the pixel section 200 for simplification of explanation, but in practice, a large number of pixels, for example several millions or more, are arranged.

Each of the pixels 201 is provided with one of color filters having different spectral characteristics, and three types color filters of red (R), green (G), and blue (B) are shown. In an image sensor, it is common to arrange pixels each having color filters for transmitting R, G, and B light in a pattern called a Bayer arrangement as shown in FIG. 6. In the following description, the pixels 201 having color filters that transmit red, green, and blue light are also referred to as "R pixel", "G pixel", and "B pixel", respectively.

Each of the selection circuits 600a to 600h is connected to four column output lines 206 and one of the readout circuits 208a to 208h, and sequentially selects pixel signals of each pixel 201 output via the four column output lines 206 to output to each of the readout circuits 208a to 208h. That is, while the vertical scanning unit 202 selects a row of the pixel section 200 in one vertical scanning period, the selection circuits 600a to 600h sequentially select pixel signals output through the four column output lines 206, and A/D conversion is performed in the readout circuits 208a to 208h.

As shown in FIG. 6, the column output lines 206 connected to the selection circuits 600a to 600d are connected to the R pixels and the G pixels, and the column output lines 206 connected to the selection circuits 600e to 600h are connected to the B pixels and the G pixels.

Figure 7:
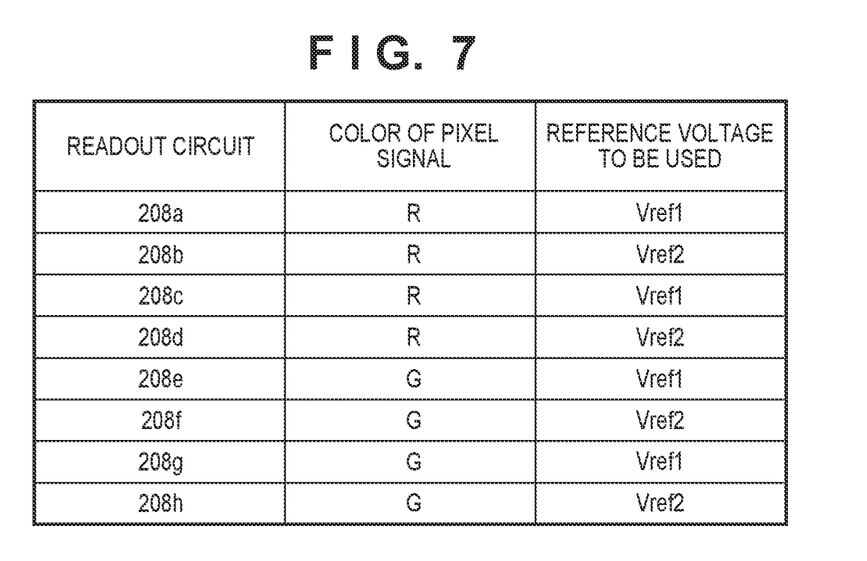
FIG. 7 is a reference voltage switching control table according to the second embodiment.

FIG. 7 is a reference voltage switching control table in the second embodiment, and illustrates reference voltage patterns used in the readout circuits 208a to 208h.

FIG. 7 shows reference voltage switching control method in a certain vertical scanning period in a case where pixel signals of the R pixels are output to the readout circuits 208a to 208d and pixel signals of the G pixels are output to the readout circuits 208e to 208h and are read out in parallel.

In this case, among the readout circuits 208a to 208d for A/D-converting signals from the R pixels having the same spectral characteristics, the reference voltages Vref1 and Vref2 are alternately supplied so that the reference voltages of adjacent readout circuits are as different as possible. On the other hand, among the readout circuits 208e to 208h for A/D-converting the signals from the G pixels, the reference voltages Vref1 and Vref2 are alternately supplied so that the reference voltages of adjacent readout circuits are as different as possible.

In this way, even when the color of the pixel signals processed by the adjacent readout circuits 208a to 208h is the same, the switching control is performed so that the reference voltages of the adjacent readout circuits 208a to 208h to which the pixel signals of the same color are input are different, kickback noise can be reduced.

Note that the switching control method described above is merely an example, and various modifications are possible within the scope of the aspect of the embodiments in accordance with the design and characteristics of individual image sensors and their image quality.

For example, in the configuration of the image sensor 105 of the second embodiment, various combinations of pixel signals to be A/D-converted in parallel are conceivable depending on the wiring configuration from the vertical scanning unit 202 to each pixel 201, scanning method and the selection order of the selection circuits 600a to 600h. Here, among the pixels 201 with color filters having the same kind of spectral characteristics, pixel signals output from adjacent pixels 201 tend to be of the same level. For this reason, the circuit control unit 204 performs switching control so that the reference voltages of the adjacent circuit control units 204 to which the signals output from the adjacent pixels 201 are input are different from each other, thereby reducing the kickback noise.

In general, the image sensor 105 can read out pixel signals by adding/decimating them in the vertical/horizontal direction/directions for each actuation mode, so the combinations of pixel signals to be A/D converted also change depending on the actuation mode. Therefore, the circuit control unit 204 controls the switching of the reference voltages according to the actuation mode of the image sensor 105 determined by the system control unit 108, thereby obtaining the kickback noise reduction effect according to the actuation mode.

Further, according to the above concept, the aspect of the embodiments can be applied regardless of the spectral characteristics of the color filters and arrangement of the color filters.

In the first and second embodiments, the case where two types of voltage values are used as reference voltages has been described, but the disclosure is not limited to this, and three or more types of voltage values may be used as reference voltages, and selectively supplied to the comparators 402. In this case, the phases of the digital output signals from the comparators 402 are further dispersed, and the occurrence of kickback noise can be further reduced.

Figure 8A:
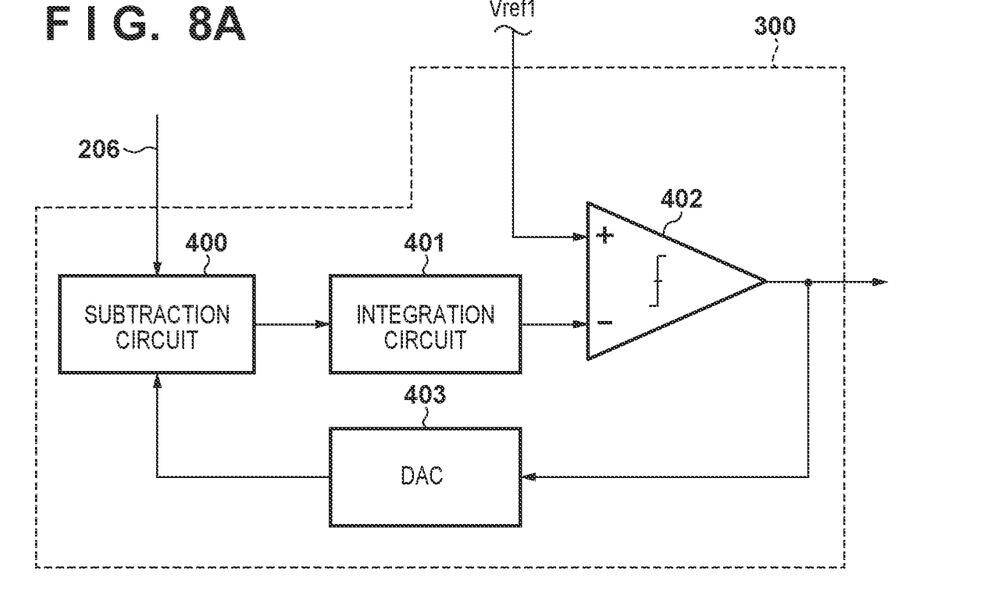
FIGS. 8A and 8B are block diagrams showing configurations of a ΔΣ ADC according to a modification.
Figure 8B:
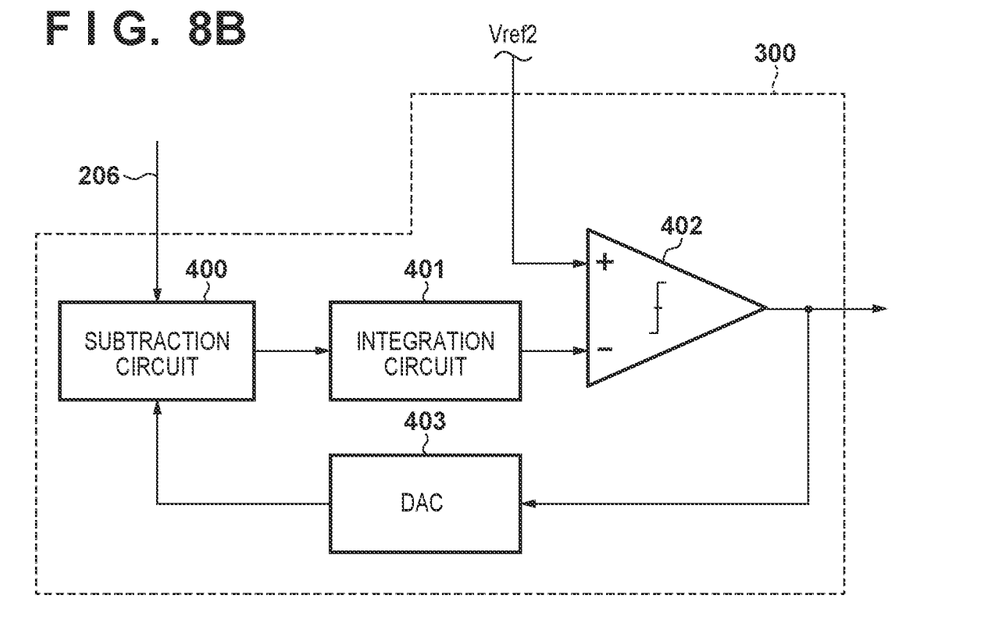

Further, instead of using the circuit control unit 204 and the reference voltage switching unit 404, which of the reference voltages Vref1 and Vref2 is to be used may be fixed in circuit configuration so that the reference voltages are different even in a case where the pixel signals of the adjacent readout circuits 208 are of the same color. In this case, the readout circuit 208 in which the reference voltage Vref1 is input to the comparator 402 as shown in FIG. 8A and the readout circuit 208 in which the reference voltage Vref2 is input to the comparator 402 as shown in FIG. 8B are arranged alternately in the signal readout unit 207. In this case, switching control of the reference voltages according to the actuation mode of the image sensor 105 cannot be performed, but the circuit configuration of the readout circuit 208 can be simplified.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-152807, filed Sep. 26, 2022, which is hereby incorporated by reference herein in its entirety.

What is claimed is:

1. An apparatus comprising:
   one or more processors and/or circuitry which function as:
   a plurality of analog-to-digital conversion units that performs analog-to-digital conversion using ΔΣ modulation by comparing a signal output from a plurality of pixels to a reference voltage; and
   a plurality of supply units that supply one of a plurality of different reference voltages to each of the plurality of analog-to-digital conversion units,
   wherein the plurality of supply units supply different reference voltages to adjacent analog-to-digital conversion units among the plurality of analog-to-digital conversion units.

2. The apparatus according to claim 1, wherein each of the plurality of supply units has a selection unit that selects one of the plurality of different reference voltages, and supplies the selected reference voltage to the plurality of analog-to-digital conversion units.

3. The apparatus according to claim 1, wherein the plurality of supply units are wirings that supply different reference voltages to the adjacent analog-to-digital conversion units.

4. The apparatus according to claim 1, wherein each of the plurality of pixels is covered with a color filter having one type of spectral characteristic among a plurality of types of spectral characteristic, and of the plurality of analog-to-digital conversion units, the adjacent analog-to-digital conversion units perform analog-to-digital conversion on signals output from pixels covered with color filters having a same type of spectral characteristics.

5. A sensor comprising:
a plurality of pixels; and
an apparatus comprising one or more processors and/or circuitry which function as:
   a plurality of analog-to-digital conversion units that performs analog-to-digital conversion using $\Delta\Sigma$ modulation by comparing a signal output from the plurality of pixels and a reference voltage; and
   a plurality of supply units that supply one of a plurality of different reference voltages to each of the plurality of analog-to-digital conversion units,
wherein the plurality of supply units supply different reference voltages to adjacent analog-to-digital conversion units among the plurality of analog-to-digital conversion units.

6. The sensor according to claim 5, wherein each of the plurality of supply units has a selection unit that selects one of the plurality of different reference voltages, and supplies the selected reference voltage to the plurality of analog-to-digital conversion units.

7. The sensor according to claim 5, wherein the plurality of supply units are wirings that supply different reference voltages to the adjacent analog-to-digital conversion units.

8. The sensor according to claim 5, wherein each of the plurality of pixels is covered with a color filter having one type of spectral characteristic among a plurality of types of spectral characteristic, and
   of the plurality of analog-to-digital conversion units, the adjacent analog-to-digital conversion units perform analog-to-digital conversion on signals output from pixels covered with color filters having a same type of spectral characteristics.

9. An electronic device comprising:
a sensor comprising:
   a plurality of pixels; and
   an apparatus comprising one or more processors and/or circuitry which function as:
      a plurality of analog-to-digital conversion units that performs analog-to-digital conversion using $\Delta\Sigma$ modulation by comparing a signal output from the plurality of pixels and a reference voltage; and
      a plurality of supply units that supply one of a plurality of different reference voltages to each of the plurality of analog-to-digital conversion units; and
a control unit that switches the reference voltage to be supplied to each of the plurality of analog-to-digital conversion units according to an actuation mode of the sensor,
wherein the plurality of supply units supply different reference voltages to adjacent analog-to-digital conversion units among the plurality of analog-to-digital conversion units.

10. The electronic device according to claim 9, wherein each of the plurality of supply units has a selection unit that selects one of the plurality of different reference voltages, and supplies the selected reference voltage to the plurality of analog-to-digital conversion units.

11. The electronic device according to claim 9, wherein the plurality of supply units are wirings that supply different reference voltages to the adjacent analog-to-digital conversion units.

12. The electronic device according to claim 9, wherein each of the plurality of pixels is covered with a color filter having one type of spectral characteristic among a plurality of types of spectral characteristic, and
   of the plurality of analog-to-digital conversion units, the adjacent analog-to-digital conversion units perform analog-to-digital conversion on signals output from pixels covered with color filters having a same type of spectral characteristics.

* * * * *